United States Patent [19]
Masaki et al.

[11] Patent Number: 4,506,701
[45] Date of Patent: Mar. 26, 1985

[54] SOLENOID-OPERATED VALVE FOR SELECTING ONE OF TWO PRESSURE SOURCES

[75] Inventors: Kazuo Masaki, Kariya; Ryohei Hiramatsu, Aichi, both of Japan

[73] Assignee: Nippondenso Co., Ltd., Kariya, Japan

[21] Appl. No.: 493,593

[22] Filed: May 11, 1983

[30] Foreign Application Priority Data

May 12, 1982 [JP] Japan ................... 57-79498

[51] Int. Cl.³ .......................... F15B 13/044
[52] U.S. Cl. ................ 137/596.17; 137/870; 251/65; 251/137; 251/139
[58] Field of Search .......... 137/596.17, 870; 251/65, 137, 139

[56] References Cited
FOREIGN PATENT DOCUMENTS 12274 3/1974 Japan .

Primary Examiner—Gerald A. Michalsky
Attorney, Agent, or Firm—Cushman, Darby & Cushman

[57] ABSTRACT

A solenoid-operated valve for selecting one of two pressure sources has a stationary core which comprises a cylindrical magnetic body which is energized by an excitation current of selected direction and which is housed in a cylindrical valve housing. First and second magnet chambers communicating with first and second pressure sources at two ends of the stationary core are defined in the portions of the housing which oppose first and second pole faces. First and second permanent magnets which are magnetized to the poles opposite to those of the first and second pole faces are respectively housed in the first and second magnet chambers. A first valve member is formed integrally with the first permanent magnet and closes a vent hole communicating with the first pressure source when the first permanent magnet is repelled from the first pole face. A second valve member is formed integrally with the second permanent magnet and closes a vent hole formed in the stationary core when second permanent magnet is attracted to the second pole face.

20 Claims, 8 Drawing Figures

SOLENOID-OPERATED VALVE FOR SELECTING ONE OF TWO PRESSURE SOURCES

BACKGROUND OF THE INVENTION

The present invention relates to a solenoid-operated valve for selecting one of two pressure sources, which is particularly adapted for supplying pressure information to a pressure transducer for converting pressure information obtained with a diaphragm into physical position data.

In order to supply pressure information for control to a pressure transducer for converting such pressure information into position information, a first pressure source as a negative pressure source and a second pressure source as an atmospheric pressure source are used. The pressure information from the first and second pressure sources is supplied to the pressure transducer using a solenoid-operated valve system. First and second pipes for transmitting pressure information are interposed between the pressure transducer and the first and second pressure sources, respectively. First and second solenoid-operated valves are arranged for the first and second pipes, respectively. Either the first or second solenoid-operated valve is opened to allow the negative or atmospheric pressure, respectively, to act on the pressure transducer.

However, this type of system requires two solenoid-operated valves for a single pressure transducer, and the two valves must be opened/closed in the opposite manner. Therefore, the overall system becomes complex in construction, and the two solenoid-operated valves used must have the same standards.

SUMMARY OF THE INVENTION

It is an object of the present invention to provide a solenoid-operated valve for selecting one of two pressure sources, wherein two vent holes communicating with first and second pressure sources, respectively, are opened/closed in the opposite manner by supplying excitation currents of opposite directions.

It is another object of the present invention to provide a solenoid-operated valve wherein two valve members are operated in the opposite manner by a single stationary core, such that one of the first and second pressure sources is selectively connected to an output vent hole.

It is still another object of the present invention to provide a solenoid-operated valve wherein a stationary core is formed into a columnar shape to have pole faces at its both ends, first and second valve members are arranged in series with the stationary core, and the overall structure is housed in a cylindrical housing, so that the manufacture/assembly is not difficult and the overall assembly becomes small and light.

It is still another object of the present invention to provide a solenoid-operated valve wherein two vent holes communicating with first and second pressure sources, respectively, are both closed, so that the first and second pressure sources may not act on the load when no excitation current is supplied.

The solenoid-operated valve of the present invention has a stationary core which has first and second pole faces magnetized to the opposite poles. First and second permanent magnets are arranged to oppose the first and second pole faces such that the first and second permanent magnets have opposite magnetic poles to those of the opposing first and second pole faces. A vent hole is formed in the stationary core to communicate between the first and second pole faces. The first and second permanent magnets attract and repel each other such that the vent hole communicating with the first pressure source is closed when the first permanent magnet is repelled from the core and the vent hole of the stationary core communicating with the second pressure source is closed when the second permanent magnet is attracted to the core.

According to the solenoid-operated valve of the present invention as described above, the excitation poles of the stationary core are switched so as to select one of the first and second pressure sources. More specifically, this control for selecting one of the two pressure sources may be achieved by selecting the direction of an excitation current which flows into the excitation coil for the stationary core. If the stationary core is columnar in shape and its two end faces comprise the first and second pole faces, the stationary core and the first and second permanent magnets are arranged in series with each other on a single axis. Then, the solenoid operated valve may be readily assembled in a single cylindrical housing. In other words, assembly and associated operations of the valve are easy, and the valve becomes small and light.

DETAILED DESCRIPTION OF THE PREFERRED EMBODIMENTS

Figure 1:
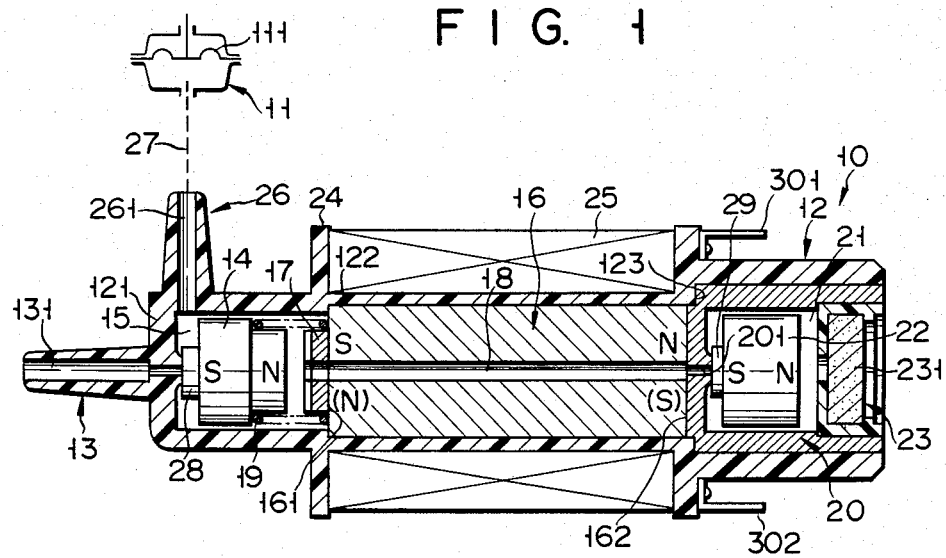
FIG. 1 is a sectional view for explaining the structure of a solenoid-operated valve according to a first embodiment of the present invention.

FIG. 1 shows the structure of a solenoid-operated valve 10 which selects a first pressure source, i.e., a negative pressure source, and a second pressure source, i.e., an atmospheric pressure source, so that the pressure of the selected pressure source acts on a pressure transducer 11 having a diaphragm 111. The solenoid-operated valve 10 has a valve housing 12 formed of a synthetic resin in a cylindrical shape and an end opening which is closed with a bottom plate 121. An inlet port 13 with a vent hole 131 communicating with the first pressure source, i.e., the negative pressure source (not shown), is formed at the center of the bottom plate 121.

A first permanent magnet 14 of a cylindrical shape is inserted to the valve housing 12 from its open end such that the magnet 14 abuts against the bottom plate 121.

The first permanent magnet 14 is axially movable and is arranged in a first magnet chamber 15 which is defined inside the valve housing 12 by a first step 122. Beyond the first step 122, the inner diameter of the valve housing 12 has a larger diameter than that of the first magnet chamber 15.

A cylindrical stationary core 16 made of a magnetic material is pressed into the valve housing 12 from its open end until it abuts against the first step 122. Since the valve housing 12 consists of a synthetic resin, pressing of the heated stationary core 16 into the valve housing 12 results in secure holding of the stationary core 16 in the housing 12. First and second magnetic poles 161 and 162 are respectively established at the two end faces of the stationary core 16 inserted in the valve housing 12. A spacer 17 of a nonmagnetic material is integrally formed with the surface of the first magnetic pole 161 which opposes the first permanent magnet 14. A vent hole 18 extends along the central axis of the stationary core 16 including that of the spacer 17. A compressed spring 19 is interposed between the surface of the first magnetic pole 161 of the stationary core 16 and the first permanent magnet 14, so that the first permanent magnet 14 is separated from the surface of the first magnetic pole 161.

A cylindrical auxiliary housing 20 having a bottom and made of a nonmagnetic material is pressed into the open end of the valve housing 12 up to a second step 123 formed to oppose the end of the stationary core 16. The auxiliary housing 20 fixes the stationary core 16 in position. The auxiliary housing 20 defines a second magnet chamber 21. A second permanent magnet 22 is housed inside the second magnet chamber 21 so as to be axially movable. A vent hole 201 communicating with the vent hole 18 is formed at the bottom of the auxiliary housing 20. The open end of the auxiliary housing 20 is closed with a filter mechanism 23 holding a filter 231 such that the interior of the second magnet chamber 21 communicates with the outer atmosphere.

A bobbin 24 is formed integrally around the valve housing 12 to be aligned with the stationary core 16. An excitation coil 25 is wound around the bobbin 24. The first magnet chamber 15 has an outlet portion 26 with a vent hole 261. The vent hole 261 of the outlet port 26 communicates with the pressure transducer 11 through a pipe 27.

The first and second permanent magnets 14 and 22 are respectively magnetized to the south and north poles such that their surfaces opposing the first and second magnetic poles 161 and 162 are magnetized to the opposite poles therefrom. First and second valve members 28 and 29 of a rubbery resin are formed integrally with the surfaces of the first and second permanent magnets 14 and 22 which oppose the vent holes 131 and 201. The first and second valve members 28 and 29 serve to open/close the vent holes 131 and 201, respectively. Therefore, the openings of the vent holes 131 and 201 which oppose the first and second magnet chambers 15 and 21 comprise valve seats.

Reference numerals 301 and 302 denote terminals for supplying an excitation current to the excitation coil 25 and receiving the excitation current from an excitation current circuit (not shown). The excitation current circuit selects the direction of the excitation current to be supplied. Accordingly, the stationary core 16 is magnetized either to the magnetic poles as indicated by S and N or to the magnetic poles as indicated by (N) and (S) in the figure.

When the solenoid-operated valve 10 of this structure is in the nonenergized state wherein the excitation current is not supplied to the excitation coil 25, the magnetic attracting force of the first and second permanent magnets 14 and 22 acts on the stationary core 16. Then, the second permanent magnet 22 is attracted toward the stationary core 16 inside the auxiliary housing 20, and the second valve member 22 closes the vent hole 18 which has been communicating with the atmosphere. Since the biasing force of the spring 19 is acting on the first permanent magnet 14, the first permanent magnet 14 is repelled from the stationary core 16, and the first valve member 28 closes the vent hole 131 which has been communicating with the negative pressure source.

When an excitation current is supplied to the excitation coil 25 such that the first and second magnetic poles 161 and 162 of the stationary core 16 are magnetized to the poles opposite to those of the opposing surfaces of the first and second permanent magnets 14 and 22, the first and second permanent magnets 14 and 22 are both attracted toward the stationary core 16. Then, the first valve member 28 is moved away from the opening of the vent hole 131, and the second valve member 29 is moved to close the vent hole 201 to seal off the atmospheric pressure source. Thus, the negative pressure source is connected to the outlet port 26 through the inlet port 13 and the first magnet chamber 15, and the negative pressure acts on the diaphragm 111 of the pressure transducer 11.

When an excitation current of the opposite direction to that described above is supplied to the excitation coil 25, the first and second magnetic poles 161 and 162 of the stationary core 16 respectively apply a repelling force on the first and second permanent magnets 14 and 22. Therefore, the first and second permanent magnets 14 and 22 are repelled from the magnetic poles 161 and 162 of the stationary core 16. The first valve member 28 closes the vent hole 131 to seal off the negative pressure source, and the second valve member 29 opens the vent hole 201 so as to allow communication thereof with the atmospheric pressure source. Thus, the atmospheric pressure acts on the diaphragm 111 of the pressure transducer 11. In this manner, the negative pressure or atmospheric pressure selectively acts on the pressure transducer 11 by switching the direction of the excitation current to be supplied to the excitation coil 25, thereby achieving position control of the diaphragm 111.

Figure 2:
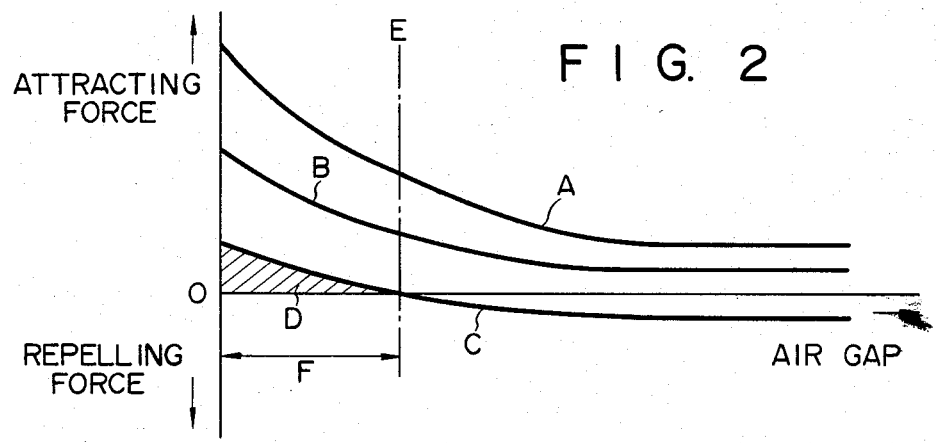
FIG. 2 is a graph showing the relationship between the magnetic attracting and repelling forces and the air gap of the permanent magnet used in the solenoid-operated valve shown in FIG. 1.

In the solenoid-operated valve 10, the first and second permanent magnets 14 and 22 are selectively attracted to or repelled from the stationary core 16 in accordance with the direction of the excitation current. FIG. 2 shows the relationship between the air gap between the permanent magnets and the stationary core, and the magnetic attracting and repelling forces acting on the permanent magnets. Curve A represents a case wherein the coil is energized such that the attracting force acts to attract the permanent magnets toward the stationary core. Curve B represents a case wherein the coil is not energized. Curve C represents a case wherein the coil is energized such that the repelling force acts to repel the permanent magnets from the stationary core.

The first and second permanent magnets 14 and 22 comprise a magnetic material and have the magnetic attracting force normally acting on the stationary core 16. Even if an excitation current is supplied to the excitation coil such that the first and second permanent magnets 14 and 22 are repelled, an attracting force D as shown in the figure also acts. In order to effectively apply the repelling force, which is produced when the opposite magnetic poles oppose each other, to the first and second permanent magnets 14 and 22, a characteristic region to the left of curve E having a wide air gap may be used.

Good results can be obtained when spacer members are interposed between the first and second magnetic poles 161 and 162 of the stationary core 16 and the first and second permanent magnets 14 and 22 so as to set air gaps of a distance F or greater. For this purpose, the spacer 17 and the bottom plate of the auxiliary housing 20 are used.

Figure 3:
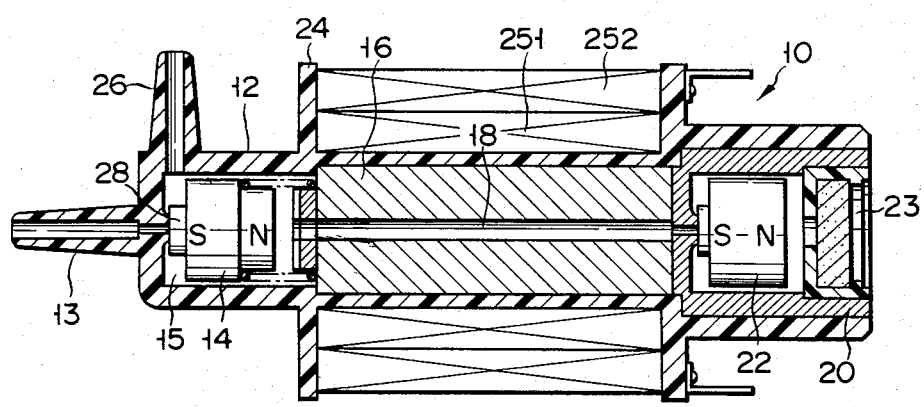
FIG. 3 is a sectional view showing the structure of a solenoid-operated valve according to a second embodiment of the present invention.
Figure 4:
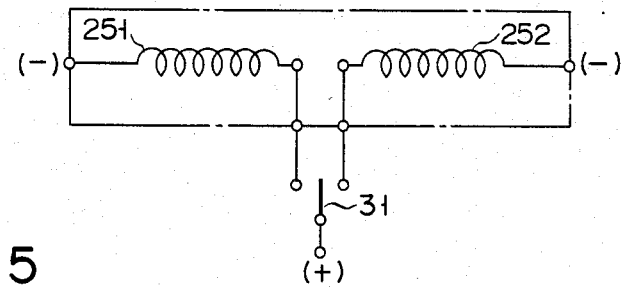
FIG. 4 is a circuit diagram of a current circuit for the solenoid-operated valve shown in FIG. 3.

FIG. 3 shows a solenoid-operated valve 10 according to a second embodiment of the present invention. In this embodiment, first and second excitation coils 251 and 252 are wound in two layers around a bobbin 24. An excitation current switched by a switch 31 as shown in FIG. 4 supplied to the first and second excitation coils 251 and 252. By selectively supplying an excitation current to one of the first and second excitation coils 251 and 252, the magnetic poles of a stationary core 16 are reversed.

Figure 5:
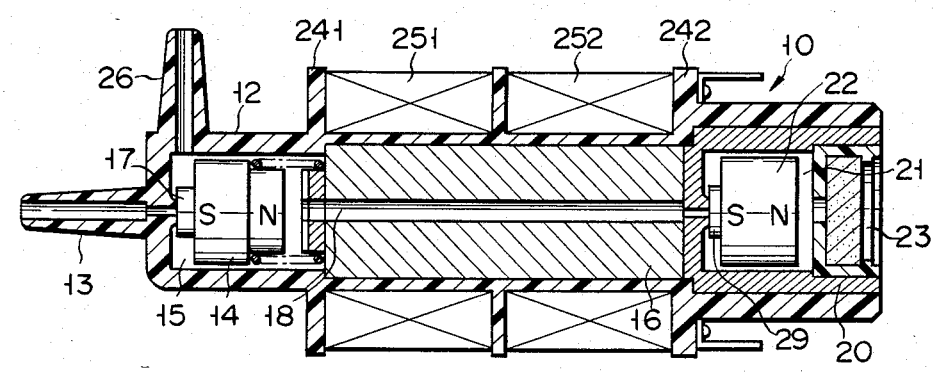
FIG. 5 is a sectional view showing the structure of a solenoid-operated valve according to a third embodiment of the present invention.

In a solenoid-operated valve 10 according to a third embodiment of the present invention as shown in FIG. 5, two bobbins 241 and 242 are formed next to each other around a valve housing 12. First and second excitation coils 251 and 252 are wound around the bobbins 241 and 242, respectively.

In FIGS. 3 to 5, the same reference numerals denote the same parts as in FIG. 1 and a detailed description thereof will be omitted.

Figure 6:
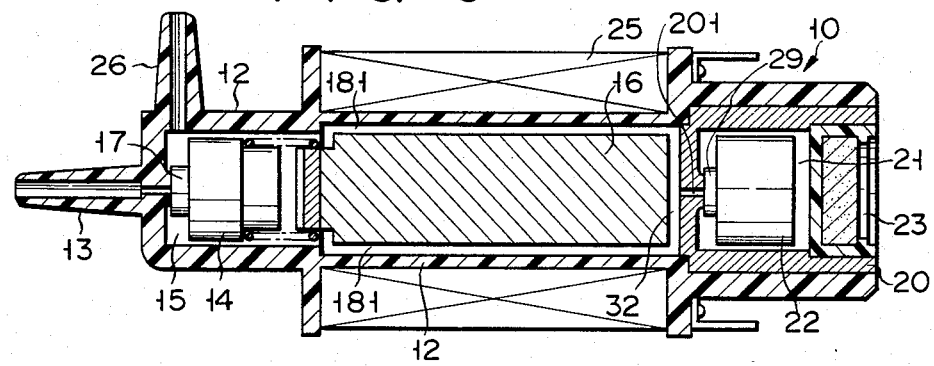
FIG. 6 is a sectional view showing the structure of a solenoid-operated valve according to a fourth embodiment of the present invention.
Figure 7A:
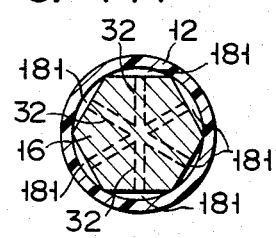
FIG. 7A is a sectional view showing a stationary core of the solenoid-operated valve shown in FIG. 6.

In the embodiments described above, the vent hole 18 is formed extending along the central axis of the stationary core 16, and the atmospheric pressure is introduced therethrough into the first magnet chamber 15. However, as in a fourth embodiment shown in FIG. 6, a vent hole may be formed around the stationary core 16. In a modification shown in FIG. 7A, the stationary core 16 comprises a columnar body which has a polygonal sectional shape, for example, a hexagonal shape. The inner surface of the valve housing 12 has a cylindrical shape so as to define a plurality of 6 vent holes 181 between the outer surface of the stationary core 16 and the inner surface of the valve housing 12.

When the vent holes 181 are formed around the outer surface of the stationary core 16, they may not be directly closed by the second valve member 29. Thus, grooves (indicated by the broken lines) are formed in an end surface of the stationary core 16 opposing the auxiliary housing 20 to extend from the respective vent holes 181 to the central axis of the housing 12 as indicated by the broken lines in FIG. 7A. Thus, the vent holes 181 communicate with the vent hole 201 of the auxiliary housing 20.

Figure 7B:
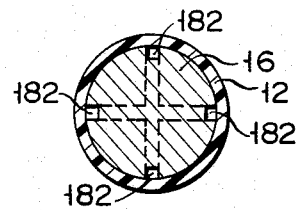
FIG. 7B is a sectional view showing another example of the stationary core shown in FIG. 7A.

Furthermore, as shown in another modification shown in FIG. 7B, the stationary core 16 may have a cylindrical shape and have a plurality of grooves extending in the axial direction along its outer surface. These grooves serve as vent holes 182.

What we claim is:

1. A solenoid-operated valve for selecting one of two pressure sources, comprising:
    a stationary core which is made of a magnetic material and which has first and second pole faces to be magnetized to first and second poles which are opposite to each other;
    excitation coil means for exciting the stationary core to one of the first and second poles;
    vent hole means for communicating between said first and second pole faces of said stationary core;
    first and second permanent magnets which are respectively arranged to oppose said first and second pole faces of said stationary core, surfaces of which permanent magnets are magnetized to the opposite poles;
    first and second magnet chambers which communicate with first and second pressure sources, respectively, and which house said first and second permanent magnets therein such that said first and second permanent magnets may be attracted to or repelled from said stationary core;
    a first valve member which is formed integrally with said first permanent magnet and which closes a vent hole communicating with said first pressure source when repelled from said first pole face of said stationary core;
    a second valve member which is formed integrally with said second permanent magnet and which closes said vent hole means of said stationary core when attracted to said second pole face of said stationary core; and
    an output vent hole formed in said first magnet chamber.

2. A valve according to claim 1, wherein said stationary core is columnar in shape, and ends thereof along an axial direction thereof define said first and second pole faces.

3. A valve according to claim 1, wherein said stationary core is columnar in shape and is inserted in a cylindrical valve housing consisting of a synthetic resin, and said first and second magnet chambers are partially defined by portions of said stationary core which comprise said first and second pole faces.

4. A valve according to claim 3, wherein said valve housing has one end comprising a bottom plate which opposes said first magnet chamber, and said vent hole communicating with said first pressure source is formed at a center of said bottom plate.

5. A valve according to claim 3, wherein said valve housing has a step at a portion defining said first magnet chamber such that an inner diameter thereof at a portion receiving said stationary core is large, and said stationary core is pressed into said valve housing from a direction of said second magnet chamber and is regulated in position by said step.

6. A valve according to claim 3, wherein an auxiliary housing defining said second magnet chamber is pressed into and held in position in said valve housing from an end thereof from which said stationary core is inserted.

7. A valve according to claim 3, wherein bobbin means is formed at a position around said cylindrical valve housing which corresponds to said stationary core, and excitation coil means is wound around said bobbin means.

8. A valve according to claim 7, wherein said excitation coil means comprises a single excitation coil to which an excitation current of a selected direction is supplied.

9. A valve according to claim 7, wherein said excitation coil wound around said bobbin means comprises first and second excitation coils to which excitation currents of opposite directions are selectively supplied.

10. A valve according to claim 9, wherein said first and second excitation coils are wound in two layers.

11. A valve according to claim 9, wherein said bobbin means comprises two bobbins which are separated along an axis of said stationary core, and said first and second excitation coils are respectively wound around said two bobbins.

12. A valve according to claim 1, wherein said stationary core is columnar in shape and ends thereof along an axial direction thereof define said first and second pole faces, and said vent hole means communicating between said first and second pole faces is formed to extend along a central axis of said stationary core.

13. A valve according to claim 1, wherein said stationary core is columnar in shape and is inserted in a cylindrical valve housing consisting of a synthetic resin, said vent hole means communicating between said first and second pole faces being formed between an outer surface of said stationary core and an inner surface of said valve housing.

14. A valve according to claim 13, wherein said stationary core is polygonal in sectional shape and said vent hole means disposed around the outer surface of said stationary core comprises a plurality of gaps formed between the outer surface of said stationary core and the inner surface of said valve housing.

15. A valve according to claim 13, wherein said stationary core has a sectional shape such that said stationary core coincides with said valve housing, and said vent hole means disposed around the outer surface of said stationary core comprises a plurality of grooves formed in the outer surface of said stationary core.

16. A valve according to claim 13, wherein a guide vent hole for communicating said vent hole means disposed around the outer surface of said stationary core to a central axis is formed on a surface of said stationary core which opposes said second permanent magnet, and said guide vent hole opens to oppose said second permanent magnet at a portion thereof corresponding to said central axis.

17. A valve according to claim 1, wherein a spring is interposed between said first pole face of said stationary core and said first permanent magnet so as to bias said first permanent magnet away from said first pole face.

18. A valve according to claim 17, wherein said spring has a biasing force which is strong enough to separate said first permanent magnet from said first pole face when said stationary core is not energized, and which allows said first permanent magnet to be attracted to said first pole face when said stationary core is energized to attract said first permanent magnet.

19. A valve according to claim 1, wherein spacer members of a nonmagnetic material are arranged on said first and second pole faces of said stationary core which oppose said first and second permanent magnets.

20. A valve according to claim 19, wherein a thickness of said spacer members is selected so that air gaps are sufficiently large to cancel attracting forces of said first and second permanent magnets acting on said stationary core when said stationary core is magnetized to repel said first and second permanent magnets.

* * * * *